United States Patent
Mishra et al.

(10) Patent No.: US 10,965,648 B2
(45) Date of Patent: Mar. 30, 2021

(54) ENFORCING INSTRUCTIONS OF A SEGMENTATION POLICY ON A NETWORK MIDPOINT DEVICE

(71) Applicant: Illumio, Inc., Sunnyvale, CA (US)

(72) Inventors: Rupesh Kumar Mishra, Santa Clara, CA (US); Paul James Kirner, Palo Alto, CA (US)

(73) Assignee: Illumio, Inc., Sunnyvale, CA (US)

( * ) Notice: Subject to any disclaimer, the term of this patent is extended or adjusted under 35 U.S.C. 154(b) by 118 days.

(21) Appl. No.: 16/115,145

(22) Filed: Aug. 28, 2018

(65) Prior Publication Data

US 2020/0076769 A1 Mar. 5, 2020

(51) Int. Cl.
*H04L 29/06* (2006.01)
*H04L 12/24* (2006.01)

(52) U.S. Cl.
CPC ...... *H04L 63/0263* (2013.01); *H04L 41/0803* (2013.01); *H04L 41/0893* (2013.01); *H04L 63/0236* (2013.01); *H04L 63/101* (2013.01); *H04L 63/20* (2013.01); *H04L 41/12* (2013.01)

(58) Field of Classification Search
CPC . H04L 63/0263; H04L 63/0101; H04L 63/20; H04L 63/0236
USPC ......................................................... 726/13
See application file for complete search history.

(56) References Cited

U.S. PATENT DOCUMENTS

| | | | |
|---|---|---|---|
| 7,945,945 B2 * | 5/2011 | Graham | H04L 29/12009 713/151 |
| 2005/0237939 A1 | 10/2005 | Corl et al. | |
| 2007/0255828 A1 * | 11/2007 | Paradise | H04L 47/746 709/225 |
| 2016/0248696 A1 | 8/2016 | Van Heuklon et al. | |
| 2016/0294646 A1 | 10/2016 | Kirner et al. | |
| 2017/0111310 A1 | 4/2017 | Glazemakers et al. | |
| 2020/0007547 A1 * | 1/2020 | Valiquette | H04L 63/20 |

OTHER PUBLICATIONS

Bednarz, A., "What is microsegmentation? How getting granular improves network security," Network World, Jan. 30, 2018, 5 pages [Online] [Accessed Jan. 30, 2020] <URL: https://www.networkworld.com/article/3247672/what-is-microsegmentation-how-getting-granular-improves-network-security.html>.
PCT International Search Report and Written Opinion, PCT Application No. PCT/US2019/048203, dated Nov. 8, 2019, 19 pages.

* cited by examiner

*Primary Examiner* — Longbit Chai
(74) *Attorney, Agent, or Firm* — Fenwick & West LLP

(57) ABSTRACT

An enforcement module operating on a server or on a network midpoint device obtains a management instruction controlling communications of a target workload. The enforcement module configures a firewall of a network midpoint device upstream from the target workload to enforce the management instruction. The configuration mechanism may be dependent on the particular capabilities and characteristics of the network midpoint device.

20 Claims, 5 Drawing Sheets

ENFORCING INSTRUCTIONS OF A SEGMENTATION POLICY ON A NETWORK MIDPOINT DEVICE

BACKGROUND

Technical Field

This application relates to managing a segmentation policy that controls communications between workloads.

Description of Related Art

A segmentation policy comprises a set of rules that control which workloads may communicate on a network and may place restrictions on how such workloads may communicate. In conventional implementations, a segmentation server distributes management instructions to host endpoints on which the workloads execute. The host endpoints configure respective firewalls according to the management instructions to enforce the segmentation policy on the individual host endpoints. However, relying exclusively on enforcement at the host endpoints may be insufficient because some host endpoints may have an inadequate enforcement mechanism or may not have any enforcement mechanism. Furthermore, enforcement exclusively at the host endpoints may cause performance issues due to resource constraints on the host endpoints or other network constraints.

SUMMARY

A system, non-transitory computer-readable storage medium, and method configures enforcement of a segmentation policy. In one embodiment, an enforcement module configures a network midpoint device to enforce a management instruction controlling communications of a target workload with a remote workload. Here, an enforcement module obtains a network topology specifying a connectivity of a downstream port of a network midpoint device to a target workload and a connectivity of an upstream port of the network midpoint device to a remote workload. The enforcement module receives the management instruction for permitting communications between the target workload and the remote workload. The enforcement module generates, based on the management instruction, a midpoint device ingress rule permitting the downstream port of the network midpoint device to receive ingress communications to the downstream port of network midpoint device that are sourced from the target workload and destined for the remote workload. The enforcement module configures the network midpoint device to enforce the midpoint device ingress rule for the downstream port.

In an embodiment, configuring the network midpoint device may comprise updating an ingress access control list associated with the downstream port to include the midpoint device ingress rule. Here, the ingress access control list causes the network midpoint device to block ingress communications to the downstream port not specifically permitted by a rule of the ingress access control list.

In an embodiment, the management instruction comprises an inbound management instruction that permits the target workload to receive inbound connection requests from the remote workload but does not permit the target workload to send outbound connection requests to the remote workload. Here, the ingress access control list further causes the downstream port to permit only ingress communications associated with an established connection and to block connection requests from the target workload.

In another embodiment, the management instruction comprises an outbound management instruction that permits the target workload to send outbound connection requests to the remote workload but does not permit the target workload to receive inbound connection requests from the remote workload. In this case, the ingress access control list causes the downstream port to permit connection requests from the target workload to the remote workload and communications associated with an established connection.

In another embodiment, the enforcement module configures the network midpoint device to enforce the management instruction on a network midpoint device that supports egress filtering. Here, the enforcement module generates based on the management instruction, a midpoint device egress rule permitting the downstream port of the network midpoint device to transmit egress communications to the target workload that are sourced from the remote workload and destined to the target workload. The enforcement module configures the network midpoint device to enforce the midpoint device egress rule for the downstream port.

In an embodiment, configuring the network midpoint device comprises updating an egress access control list associated with the downstream port to include the midpoint device egress rule. Here, the egress access control list causes the network midpoint device to block egress communications from the downstream port not specifically permitted by a rule of the egress access control list.

In another embodiment, the enforcement module configures the network midpoint device to enforce the management instruction on a network midpoint device that does not support egress filtering. In this embodiment, the enforcement module generates, based on the management instruction, a midpoint device ingress rule permitting the upstream port of the network midpoint device to receive ingress communications that are sourced from the remote workload and destined to the target workload. The enforcement module furthermore generates, based on the management instruction, midpoint device ingress deny rules denying other ports of the network midpoint device from receiving ingress communications that are destined to the target workload. The enforcement module configures the network midpoint device to enforce the midpoint device ingress rule for the upstream port and the midpoint device ingress deny rules for the other ports.

In an embodiment configuring the network midpoint device comprises updating an ingress access control list associated with the upstream port to include the midpoint device ingress rule. Here, the ingress access control list causes the network midpoint device to block ingress communications to the upstream port not specifically permitted by a rule of the ingress access control list associated with the upstream port. Additionally, configuring the network midpoint device comprises configuring respective ingress access control lists associated with the other ports of the network midpoint device. Here, the respective ingress access control lists associated with the other ports cause the network midpoint device to block ingress communications to the other ports not specifically permitted by a rule of the ingress access control lists associated with the other ports.

DETAILED DESCRIPTION

The Figures (FIGS.) and the following description describe certain embodiments by way of illustration only. One skilled in the art will readily recognize from the following description that alternative embodiments of the structures and methods illustrated herein may be employed without departing from the principles described herein. Reference will now be made to several embodiments, examples of which are illustrated in the accompanying figures. It is noted that wherever practicable similar or like reference numbers may be used in the figures and may indicate similar or like functionality.

An enforcement module operating on a server or on a network midpoint device obtains a management instruction for controlling communications of a target workload executing on a host. The enforcement module configures a firewall of a network midpoint device upstream from the target workload to enforce the management instruction. The configuration mechanism may be dependent on the particular capabilities and characteristics of the network midpoint device. Enforcing the management instruction on the network midpoint device instead of on the host beneficially enables enforcement of instructions pertaining to unmanaged workloads executing on hosts that are not capable of directly enforcing the instructions. Furthermore, enforcing the management instruction on the network midpoint device may often be desirable to more efficiently manage resources of the hosts and the network.

Figure 1:
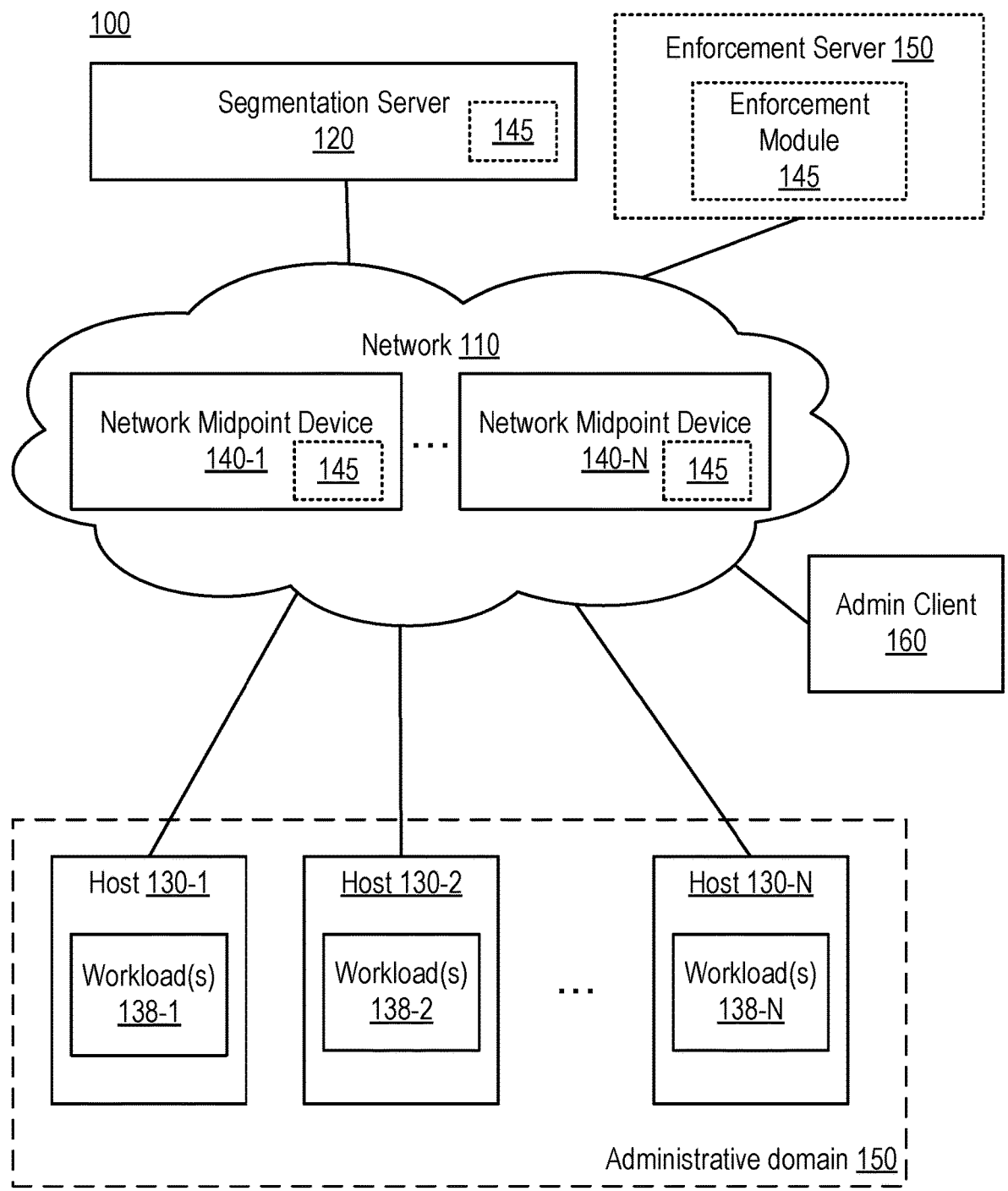
FIG. 1 is a high-level block diagram illustrating an environment for managing a segmentation policy, according to one embodiment.

FIG. 1 is a high-level block diagram illustrating a networked computing environment 100. The networked computing environment 100 includes a segmentation server 120, a network 110, one or more enforcement modules 145, an administrative client 160, and an administrative domain 150 that includes a plurality of hosts 130 (e.g., hosts 130-1, 130-2, . . . , 130-N). The administrative domain 150 can correspond to an enterprise such as, for example, a service provider, a corporation, a university, or a government agency under control of the segmentation server 120.

The network 110 represents the communication pathways between the segmentation server 120, the administrative client 160, and the hosts 130. In one embodiment, the network 110 uses standard communications technologies and/or protocols and can include the Internet. In another embodiment, the entities on the network 110 can use custom and/or dedicated data communications technologies. The network 110 includes network midpoint devices 140 (e.g., network midpoint devices 140-1, . . . , 140-N) that facilitate communications over the network 110. The network midpoint devices 140 may include, for example, routers, switches, access points, firewall devices, or other devices that control communications between the workloads 138 over the network 110. The network midpoint devices 140 may each include an integrated configurable firewall that enforces a set of firewall rules to permit or block different communications over the network 110.

The hosts 130 may each comprise a physical host device, a virtual machine executing on computer system, or an operating system instance executing on a physical host device or virtual machine capable of hosting one or more workloads 138. A single physical or virtual machine may operate a single host 130 or may operate multiple hosts 130. The hosts 130 each execute one or more workloads 138 (e.g., one or more workloads 138-1, one or more workloads 138-2, etc.). The workloads 138 comprise independently addressable computing units for performing computing tasks. A workload 138 may comprise, for example, an application or application component, a process, a container, or other sub-component thereof executing on the host 130. In some instances, a host 130 may operate only a single workload 138. In other instances, a host 130 may operate multiple workloads 138 that may be independently addressable and may perform different independent computing functions. The workloads 138 on the hosts 130 may communicate with other workloads 138 on different hosts 130 within the administrative domain 150 to perform various tasks.

The segmentation server 120 is a computer (or set of computers) that obtains and stores information about the hosts 130 on the network 120 and the workloads 138 executing on the hosts 130. The segmentation server 120 manages a segmentation policy for the administrative domain 150 that regulates communications between workloads 138 within the administrative domain 150. In an embodiment, the segmentation policy is set forth using permissive rules that specify the communications that are permitted. For example, a rule pertaining to a particular workload 138 may specify a whitelist of workloads 138 with which the particular workload 138 is permitted to communicate. The segmentation policy is enforced by blocking any communications that are not expressly permitted by the rules. For example, the segmentation policy includes a set of rules specifying whether certain workloads 138 are allowed to provide services to or receive services from other workloads 138, and may place restrictions on how those workloads 138 are allowed to communicate when providing or consuming the services. For example, a segmentation policy may include a rule specifying that a workload 138-1 operating on a host 130-1 is allowed to provide a particular service to a workload 138-2 operating on a host 130-2. Absent other rules, the workload 138-1 will thus be blocked from providing the service to a workload 138-N operating on a host 130-N. The rule may furthermore specify the type of service that the workload 138-1 is allowed to provide to workload 138-2 (e.g., a database service, a web service, etc.). A given rule may comprise an inbound rule or an outbound rule. An inbound rule for a particular workload 138 allows the particular workload 138 to accept inbound connections from specified other workloads 138 and permits the particular workload 138 to communicate with the specified other workloads bidirectionally over established connections. An outbound rule for a particular workload 138 allows the particular workload to send outbound connection requests to specified other workloads 138 and allows the particular workload 138 to communicate with the specified other workloads bidirectionally over established connections. Additionally, the rule may specify how the workloads 138-1, 138-2 may communicate when providing this service (e.g., using encrypted communication only, using authenticated communication only, etc.). A rule may be specified as a plurality of fields including a "service," a "provided-by" portion that identifies one or more workloads 138 that is permitted to provide the service (which may be specified by a port number), a "used-by" portion that identifies one or more workloads 138 that is permitted to use the service provided by the workloads 138 in the "provided-by portion," and a "rule function" that may place one or more restrictions on the communications between the workloads 138 while facilitating the service. A rule may furthermore specify one or more specific ports and/or protocols that can be used during the permitted communications.

In an embodiment, the segmentation server 120 may assign one or more labels to each workload 138 that define one or more high-level characteristics of the workload 138. Labels may be multi-dimensional. Here, a label may comprise a "dimension" (a high-level characteristic) and a "value" (the value of that high-level characteristic). For example, one possible label dimension may specify a "role" of the workload 138 and may have values such as "web," "API," or "database" specifying the role of the workload 138 within the administrative domain 150. In another example, a label dimension may specify a "location" of the workload 138 and may have values such as "United States" or "Europe." Workloads 138 may also be labeled based on a user group of a user that is logged into the workload 138 or the corresponding host 130 on which the workload 138 executes. For example, a workload 138 may have a label with a dimension "user group" and a value "managers." Each workload 138 may be assigned labels for one or more dimensions but each workload 138 does not necessarily have a label assigned for every possible dimension. For example, a workload 138 may have a label specifying its location but may not necessarily have a label specifying its role. The set of labels assigned to a particular workload 138 may be referred to herein as a label set for the workload 138.

A logical management model specifying the number and types of dimensions available and those dimensions' possible values may be configurable. In one embodiment, the logical management model includes the following dimensions and possible values, as shown in Table 1:

TABLE 1

Example of logical management model

| Dimension | Meaning (M), Values (V) |
| --- | --- |
| Role | M: The role of the workload within the administrative domain.<br>V: web, API, database |
| Environment | M: The lifecycle stage of the workload.<br>V: production, staging, development |
| Application | M: The logical application (higher-level grouping of managed servers) to which the workload belongs.<br>V: trading, human resources |
| Line of Business | M: The business unit to which the workload belongs.<br>V: marketing, engineering |
| Location | M: The location of the workload. Can be physical (e.g., country or geographical region) or logical (e.g., network). Physical is particularly useful for expressing geographic compliance requirements.<br>V: US or EU (physical), us-west-1 or us-east-2 (logical) |
| User Group | M: The user group containing the user logged onto the workload.<br>V: Engineers, Contractors, Managers, System Administrators |

The segmentation server 120 may utilize label sets to enable the segmentation policy to be defined at a high level of abstraction by specifying rules based on label sets. Thus, a rule of the segmentation policy may identify a group of workloads 138 to which a portion of the rule is applicable by referencing one or more label sets. For example, a rule may specify that a first group of workloads 138 with a label set A may provide a service B to a second group of workloads 138 with a label set C. Rules may be specified for groups of workloads 138 identified using only a subset of the label dimensions.

The segmentation server 120 may retain a repository storing information about the hosts 130 and the workloads 138 managed by the segmentation server 120. For example, the segmentation server 120 may store workload identifiers for workloads 138, and membership information indicating one or more groups of workloads 138 to which each workload 138 belongs (e.g., as defined by the respective label sets for the workloads 138).

Table 2 illustrates an example of information stored by the segmentation server 120. Here, the workload ID(s) represent the workload identifier for the workload(s) 138 executing on each host 130. The workload identifier may comprise, for example, an IP address or other identifier that uniquely identifies the workload 138. The memberships represent groups to which one or more workloads 138 executing on the host 130 belongs. Each group may correspond to a unique label set involving one or more dimensions.

TABLE 2

Example of a Repository Table

| Workload ID | Memberships |
| --- | --- |
| ID1 | A, C, D |
| ID2 | B, C |
|  | D |
| . | . |
| . | . |
| . | . |
| IDn | B, D, E, F |

The segmentation policy may be enforced by the hosts 130, by one or more of the network midpoint devices 140, or by a combination thereof. To enable enforcement of at least a portion of segmentation policy on one or more hosts 130, the segmentation server 120 generates a set of management instructions and distributes the management instructions to the hosts 130. The management instructions include the rules controlling communications between different groups of workloads 138 (e.g., specified by their label sets or directly by an identifier of the workload 138) and membership information indicating workloads 138 belonging to each group (e.g., which workloads 138 have certain label sets). An enforcement agent operating locally on the host 130 receives the management instructions and configures a local firewall to enforce the management instruction (e.g., by permitting or blocking communications to or from specified workloads 138 in accordance with the rules).

Some hosts 130 may comprise "unmanaged hosts" that do not have a local enforcement agent or a local firewall to enforce management instructions. For workloads 138 executing on these unmanaged hosts, it may be desirable to instead enforce rules at a network midpoint device 140 upstream from the unmanaged host. Furthermore, due to resource constraints of the hosts 130 or the network 110, it may be preferable to enforce some rules on a network midpoint device 140 even for workloads 138 executing on hosts 130 capable of implementing enforcement. Thus, the segmentation server 120 may determine to allocate enforcement of certain rules to one or more network midpoint devices 140.

To enable enforcement of at least a portion of the segmentation policy at the network midpoint devices 140, the segmentation server 110 obtains a topology of the network 110 specifying the connections between particular ports of the network midpoint devices 140 and the hosts 130. The topology may furthermore identify which network midpoint devices 140 are capable of enforcing a segmentation policy with respect to particular workloads 138. For example, to enforce a rule pertaining to a particular workload 138, the segmentation server 110 may identify that the particular workload 138 is coupled to a specific port of a particular network midpoint device 140. The segmentation server 120 then sends a management instructions to an enforcement module 145 associated with the particular network midpoint device 140. The enforcement module 145 generates a configuration for a firewall of the network device 140 based on the management instruction and sends the configuration to the network midpoint device 140. The configured firewall of the network midpoint device 140 can then enforce the management instruction by allowing communications between the port of the network midpoint device and the particular workload 138 consistent with the rule while blocking communications inconsistent with the segmentation policy.

The one or more enforcement modules 145 may operate on the segmentation server 120, on an external enforcement server 150, on one or more of the network midpoint devices 145, or on a combination thereof. Each enforcement module 145 may be associated with one or more network midpoint devices 140. In an embodiment, an enforcement module 145 that executes on a network midpoint device 140 may be associated with only the network midpoint device 140 on which it executes. Network midpoint devices 140 lacking an integrated enforcement module 145 may be associated with an external enforcement module 145 executing on the segmentation server 120, the enforcement server 150, or another network midpoint device 140. Here, different enforcement modules 145 may be configured to interoperate with different network midpoint devices 140. Furthermore, a particular enforcement module 145 may be associated with a single network midpoint device 140 or with multiple network midpoint devices 140.

Different enforcement modules 145 may be configured to interoperate with different types of network midpoint devices 140 that may have different configuration options and different configuration mechanisms. For example, as will be described below, the configuration may be generated differently for network midpoint devices 140 having different characteristics and capabilities. For example, the enforcement module 145 may generate the configuration differently for network midpoint devices 140 that support both ingress and egress filtering than on network midpoint devices 140 that support only ingress filtering. Furthermore, the configuration may be generated differently on network midpoint devices 140 that support a stateful firewall operation than on network midpoint devices 140 that support only stateless firewall operation.

In an embodiment, an enforcement module 145 that is external to an associated network midpoint device 140 configures the associated network midpoint device 140 by interfacing with an application programming interface (API) of the network midpoint device 140 via the network 110. Alternatively, an enforcement module 145 may export a configuration for a particular network midpoint device 140 to the administrative client 160 to enable an administrator to manually configure the network midpoint device 140. Enforcement modules 145 executing on the network midpoint devices 145 may configure firewalls of the network midpoint devices 140 directly based on received management instructions.

For efficiency of distribution, the segmentation server 120 may send different management instructions to different enforcement modules 145 so that each enforcement module 145 gets only the management instructions relevant to the rules it is assigned to enforce. Here, the segmentation server 120 may determine which rules are relevant to a given enforcement module 145 and distribute the relevant rules to that enforcement module 145. A rule may be deemed relevant to a particular enforcement module 145 if the rule is assigned to be enforced by a network midpoint device 140 associated with the enforcement module 145 and the network midpoint device 140 controls access to a host 130 that executes a workload 138 that belongs to a group (defined by one or more label sets) referenced by the rule. The segmentation server 120 may furthermore determine which membership information is relevant to each enforcement module 145 and distribute the relevant membership information to the enforcement module 145. Here, membership information may be relevant to a particular enforcement module 145 if it defines membership of a group referenced by a rule deemed relevant to the particular enforcement module 145. For rules assigned to be enforced by hosts 130, the segmentation server 120 may similarly determine relevant management instructions for each host 130 and distribute only the relevant management instructions to each host 130.

The administrative client 160 comprises a computing device that may be operated by an administrator of the administrative domain 150 being managed by the segmentation server 120. The administrative client 160 may execute an interface (e.g., via an application or web browser) that enables the administrator to interact with the segmentation server 120 to configure or view the segmentation policy. The interface may furthermore enable the administrator to obtain various information about the hosts 130 and workloads 138 on the network 120 and view traffic flows between the workloads 138.

Figure 2:
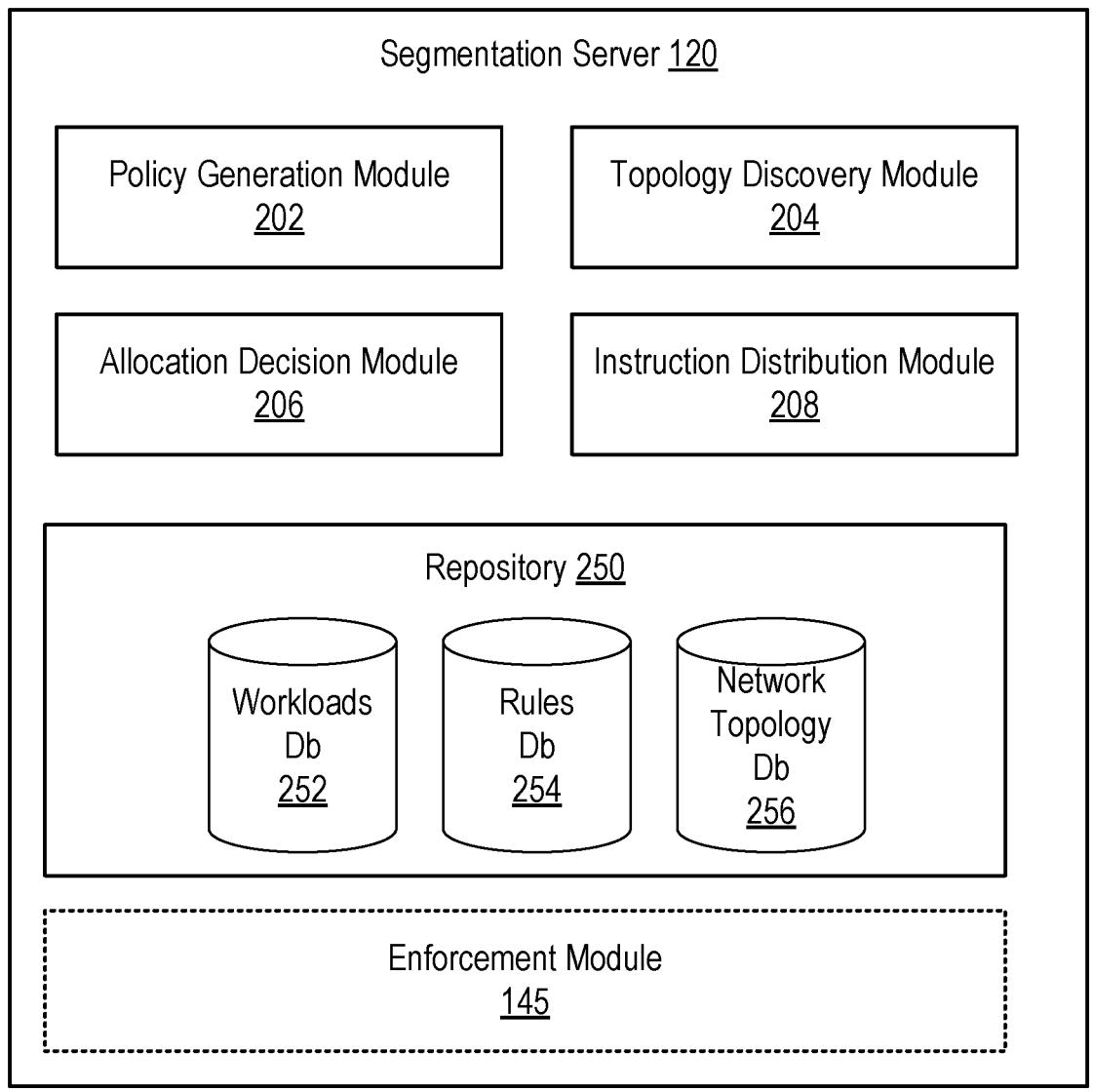
FIG. 2 is a block diagram illustrating an example embodiment of a segmentation server.

FIG. 2 is a high-level block diagram of an embodiment of a segmentation server 120. The segmentation server 120 comprises a policy generation module 202, a topology discovery module 204, an allocation decision module 206, an instruction distribution module 208, and a repository 250. The segmentation server 120 may furthermore optionally include one or more enforcement modules 145 to control one or more network midpoint devices 140. The various modules if the segmentation server 120 may be implemented as one or more processors and a non-transitory computer-readable storage medium that stores instructions executed by the one or more processors to carry out the functions attributed to the segmentation server 120 described herein.

The repository 250 may comprise a workloads database 252, a rules database 254, and a network topology database 256. The workloads database 252 stores associations between workloads 138 and their respective label sets. The rules database 254 stores a segmentation policy as a set of rules The network topology database 256 stores a network topology for an administrative domain 150 indicating the connectivity of hosts 130 to respective network midpoint devices 140 or between network midpoint devices 140.

The policy generation module 202 generates or updates a segmentation policy comprising a set of rules and generates management instructions for enforcing the rules. The segmentation policy may be generated based on configuration inputs received via the administrative client 160 providing a desired segmentation strategy. The policy generation module 202 may generate the segmentation policy at least in part based on observed traffic flows between workloads 138. For example, the policy generation module 202 may observe how workloads 138 communicate under normal conditions and generate a policy that permits those communications while preventing other communications. Alternatively, the segmentation policy may be manually configured by an administrator via the administrative client 160.

The topology discovery module 204 discovers a topology of the network 110 and stores it to the network topology database 256. For example, the topology discovery module 204 may detect network midpoint devices 140 and workloads 138 on the network 110 and detect the interconnections between the network midpoint devices 140 and the hosts 130 on which the workloads 138 execute. For example, in an embodiment, the topology discovery module 204 obtains traffic flow information from different ports of individual network midpoint devices 140 that includes identifiers for the source and destination workloads 138 associated with the traffic. Based on these identifiers, the topology discovery module 204 can detect which workloads 138 are behind a particular network midpoint device 140 and to what ports they are connected. By aggregating this information, the topology discovery module 204 can generate an interconnection graph describing the connections between the traffic midpoint devices 140 and the hosts 130 on which the workloads 138 execute. Alternatively, discovery protocols such as LLDP, CDP, or ARP may be used to discover the topology. The topology discovery module 204 may furthermore discover and store characteristics and capabilities of the traffic midpoint devices 140. For example, the topology discovery module 204 may determine if a particular network midpoint device 140 is capable of egress filtering (i.e., blocking outgoing traffic) or whether the particular network midpoint device 140 is capable of operating as stateful (as opposed to a stateless) firewall. In other alternative embodiments, the topology discovery module 204 may be omitted and the network topology database 256 may instead be manually configured by an administrator via the administrative device 160.

The allocation decision module 206 determines an enforcement allocation that specifies whether particular management instructions of the segmentation policy should be enforced by a host 130 or by a network midpoint device 140 and which particular network midpoint device 140 should perform the enforcement. For example, for each management instruction relevant to a particular workload 138, the allocation decision module 206 determines whether to enforce that instruction at the host 130 that hosts the workload 138 or on a network midpoint device 140 upstream from the workload 138. The enforcement allocation may be determined based on a configured allocation strategy or may be manually controlled by an administrator.

The instruction distribution module 208 obtains management instructions from the policy generation module 202 and distributes the relevant management instructions to the respective enforcement modules 145 or hosts 130 according to the determined allocation. For efficiency of distribution, the host configuration module 208 may transmit to a given host 130 or enforcement module 145, only instructions relevant to the workloads 138 executing on the given host 130 or network midpoint device 140 associated with the enforcement module 145 in the manner described above.

Figure 3:
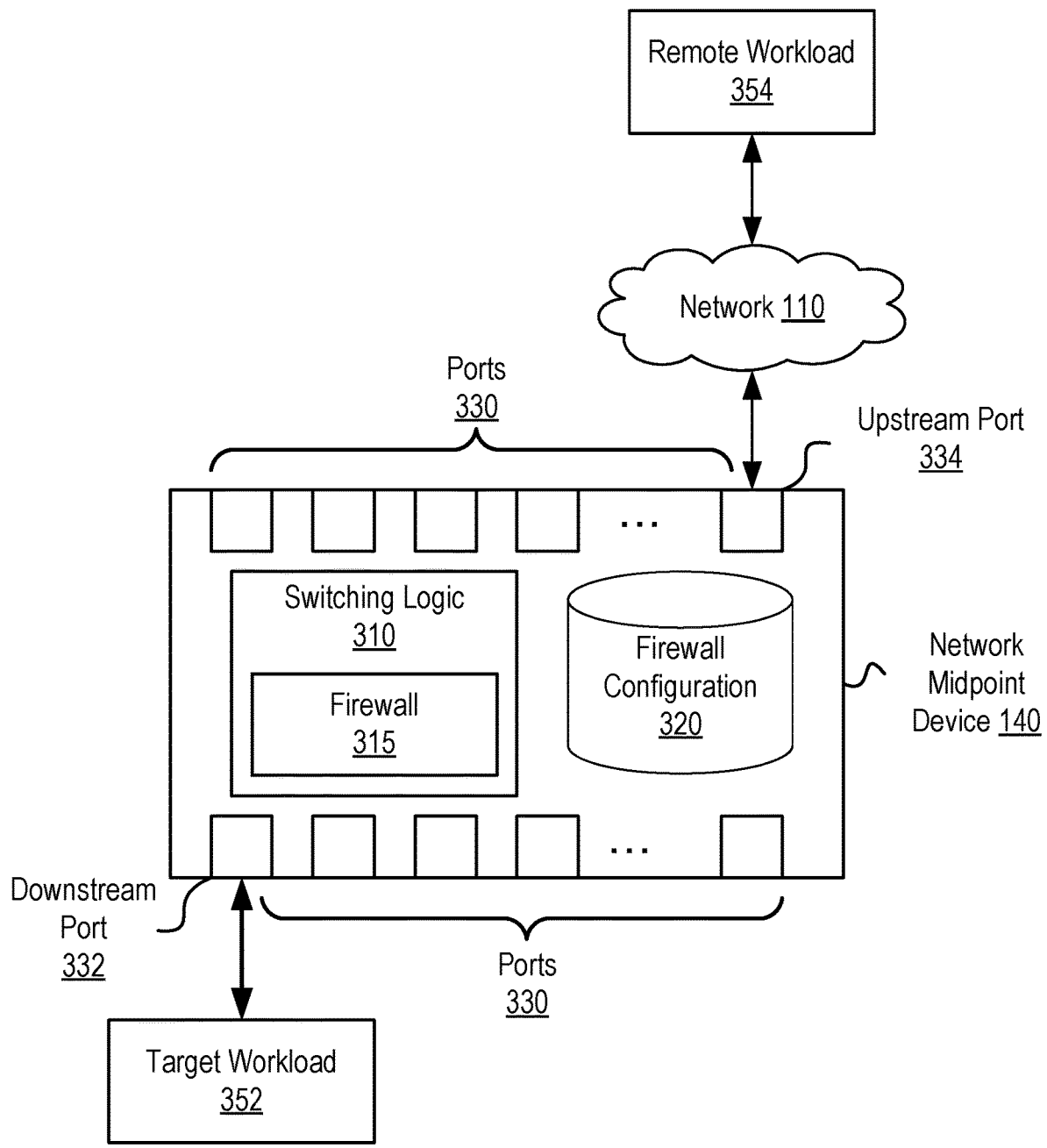
FIG. 3 is a diagram illustrating an example embodiment of a network midpoint device.

FIG. 3 illustrates an example of logical connections of an example network midpoint device 140. The network midpoint device 140 comprises a plurality of ports 330 and switching logic 310 that controls switching of packets between the ports 330. The switching logic 310 includes a firewall 315 that controls, based on the firewall configuration 320, which communications are permitted and are passed between the ports 330 and which communications are not permitted and are dropped (e.g., filtered) by the firewall 315. The connectivity configuration of the network midpoint device 140 may be obtained from the network topology database 256 and may specify that the target workload 352 is coupled to the downstream port 332 of the network midpoint device 140 and that the remote workload 354 is accessible via the upstream port 334 of the network midpoint device 140.

In the example of FIG. 3, the network midpoint device 140 is configured to enforce management instructions of a segmentation policy that apply to a target workload 352 coupled to a downstream port 332. The management instructions may specify that the target workload 352 is permitted to communicate with a remote workload 354 coupled directly or indirectly via the network 110 to an upstream port 334 of the network midpoint device 140. The management instructions may be limited to permitting communications over specific ports and/or protocols. For example, the management instructions for the target workload 352 may limit permitted communications to a specific port of the target workload 352 and to communications conforming to certain specified protocols (e.g., TCP, UDP, encrypted protocols, etc.) The management instructions may comprise inbound management instructions, outbound management instructions, or a combination of both. For example, an inbound management instruction for the target workload 352 may permit the target workload 352 to accept an inbound connection request (e.g., "syn" packets in TCP protocol) from the remote workload 354 (but does not specifically permit the target workload 352 to send outbound connection requests) and may permit the target workload 352 to communicate bidirectionally with the remote workload 354 over the established connection. An outbound management instruction for the target workload 352 may permit the target workload 352 to send an outbound connection request (e.g., "syn" packets in TCP protocol) to the remote workload 354 (but does not specifically permit the target workload 352 to accept inbound connection requests) and to communicate bidirectionally with the remote workload 354 over the established connection. The firewall 315 may detect whether a particular communication is related to a connection request or is related to an established connection based on metadata included with the communications. Embodiments of processes for configuring the network midpoint device 140 to enforce inbound and/or outbound management instructions are described in further detail below.

Figure 4:
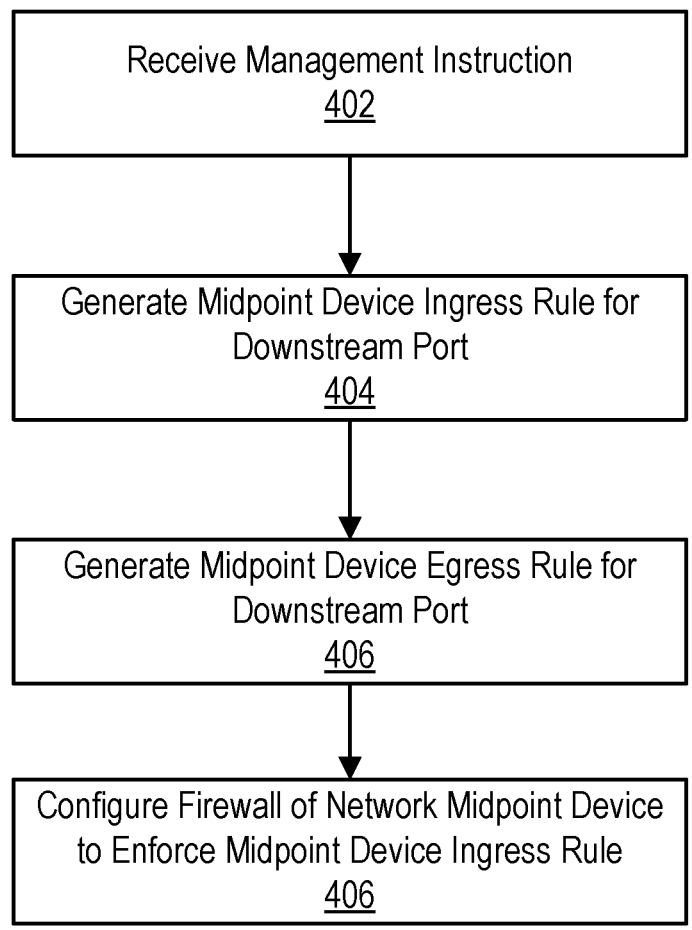
FIG. 4 is a flowchart illustrating an example embodiment of a process for generating a configuration for enforcing a management instruction for a target workload on a network midpoint device that supports both ingress and egress filtering.

FIG. 4 illustrates an example embodiment of a process performed by an enforcement module 145 to configure a firewall 315 of a network midpoint device 140 in response to a management instruction that that permits the target workload 352 to communicate with the remote workload 354 in accordance with one or more constraints (e.g., over a specified port and protocol). In the process of FIG. 4, the network midpoint device 140 enables both ingress and egress filtering. The enforcement module 145 receives 402 the management instruction for the target workload 352. The enforcement module 145 generates 404 a midpoint device ingress rule for the downstream port 332 from the management instruction that configures the firewall 315 to permit ingress communications to the downstream port 332 that are sourced from the target workload 352 and destined to the remote workload 354 and that are in accordance with the specified constraints (e.g., are received from a specified port of the target workload 352 and are in accordance with a specified protocol). If the management instruction is an inbound management instruction that permits only inbound connection requests from the remote workload 354 to the target workload 352 (but not outbound connection requests), then the midpoint device ingress rule may further limit the permitted ingress communications to the downstream port 332 to communications associated with an established connection between the target workload 352 and the remote workload 354. In this case, the midpoint device ingress rule does not permit communications relating to connection requests received at the downstream port 332 from the target workload 352 to the remote workload 354 or other communications that are not part of an established connection. If the management instruction is an outbound management instruction that permits outbound connection requests from the target workload 352 to the remote workload 354, then the midpoint device ingress rule configures the firewall 315 to permit ingress communications to the downstream port 332 relating to connection requests that are sourced from the target workload 352 and destined to the remote workload 354.

The enforcement module 145 furthermore generates 406 a midpoint device egress rule for the downstream port 332 from the management instruction that configures the firewall 315 to permit egress communications from the downstream port 332 to the target workload 352 that are sourced from the remote workload 354 and that are in accordance with the specified constraints (e.g., are destined to a specified port of the target workload 352 and are in accordance with a specified protocol). If the management instruction is an outbound management instruction that permits only outbound connection requests from the target workload 352 to the remote workload 354 (but not inbound connection requests), then the midpoint device egress rule may further limit the permitted egress communications from the downstream port 332 to communications associated with an established connection between the remote workload 354 and the target workload 352. In this case, the midpoint device egress rule does not permit connection requests as egress communications from the downstream port 332 to the target workload 352 or other communications that are not part of an established connection. If the management instruction is an inbound management instruction that permits inbound connection requests to the target workload 352 from the remote workload 354, then the midpoint device egress rule additionally permits egress communications from the downstream port 332 relating to connection requests from the remote workload 354 to the target workload 352.

The enforcement module 145 configures 408 the firewall 315 of the network midpoint device 140 to enforce the midpoint device ingress and egress rules. Particularly, the enforcement module 145 configures the firewall 315 to enable the communications permitted by the midpoint device ingress and egress rules while blocking other communications between the target workload 352 and the downstream port 332 that are not specifically permitted by another rule associated with the segmentation policy. In an embodiment, the enforcement module 145 may update an ingress access control list (ACL) associated with the downstream port 332 to include the midpoint device ingress rule. In operation, the firewall 315 of the network midpoint device 140 allows only ingress communications to the downstream port 332 permitted by the ingress ACL while blocking other communications. Similarly, the enforcement module 145 may update an egress ACL associated with the downstream port 332 to include the midpoint device egress rule. In operation, the firewall 315 of the network midpoint device 140 allows only egress communications from the downstream port 332 permitted by the egress ACL while blocking other communications.

Figure 5:
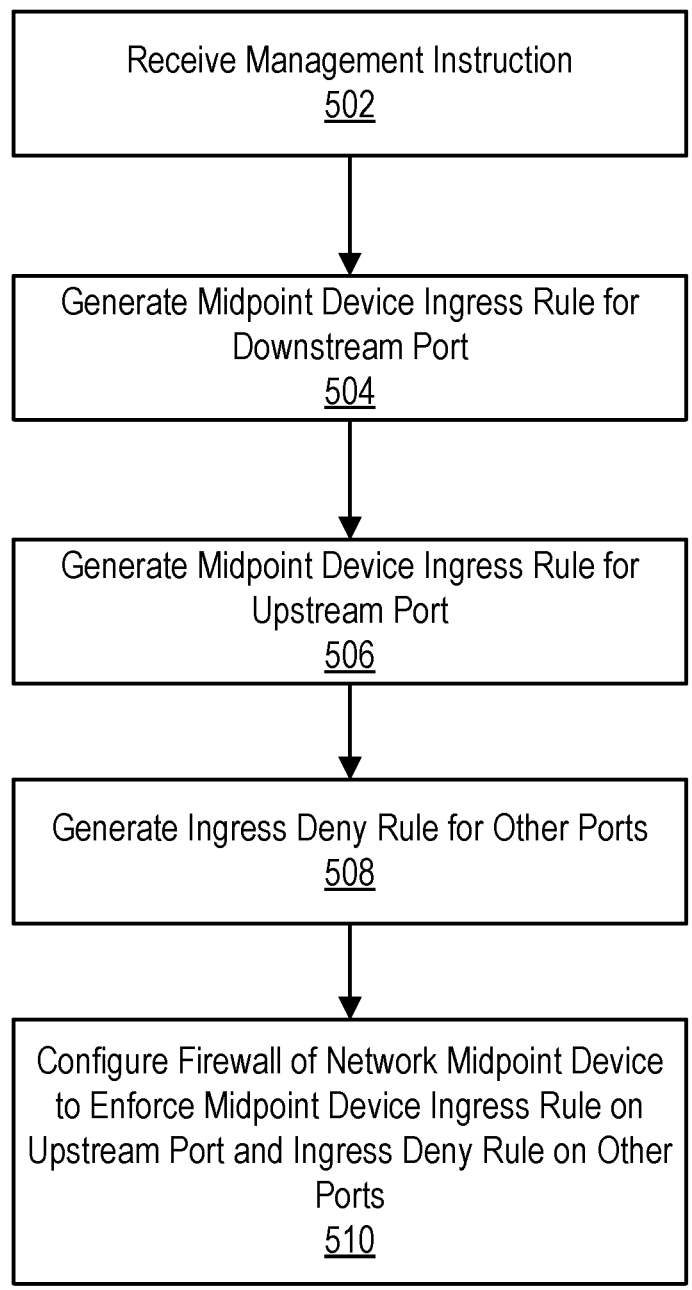
FIG. 5 is a flowchart illustrating an example embodiment of a process for generating a configuration for enforcing a management instruction for a target workload on a network midpoint device that supports only ingress filtering and does not support egress filtering.

FIG. 5 illustrates an example embodiment of a process performed by an enforcement module 145 to configure a firewall 315 of a network midpoint device 140 that supports only ingress filtering and does not support egress filtering rules. The enforcement module 145 receives 502 a management instruction for the target workload 352 that specifies a remote workload 354 from which the target workload 352 is permitted to receive communications in accordance with specified constraints (e.g., over a specified port of the target workload 352 and a specified protocol). The enforcement module 145 generates 504 a midpoint device ingress rule for the downstream port 332 from the management instruction that permits the network midpoint device 140 to receive ingress communications from the target workload 352 destined to the remote workload 354 in the same manner described above. The enforcement module 145 furthermore generates 506 a midpoint device ingress rule for the upstream port 334 based on the management instruction that configures the firewall 315 to permit ingress communications to the upstream port 334 that are sourced from the remote workload 354 and destined to the target workload 352 and that are in accordance with the specified constraints (e.g., are destined to a specified port of the target workload 352 and are in accordance with a specified protocol). If the management instruction is an outbound management instruction that permits only outbound connection requests from the target workload 352 to the remote workload 354 (but not inbound connection requests), then the midpoint device ingress rule for the upstream port 334 may further limit the permitted ingress communications to the upstream port 334 to communications associated with an established connection between the remote workload 354 and the target workload 352. In this case, the midpoint device ingress rule for the upstream port 334 does not permit connection requests as egress communications from the upstream port 334 that are sourced from the target workload 352 to the remote workload 354 or other communications that are not part of an established connection. If the management instruction is an inbound management instruction that permits inbound connection requests to the target workload 352 from the remote workload 354, then the midpoint device ingress rule for the upstream port 334 configures the firewall 315 to permit ingress communications to the upstream port 334 relating to connection requests from the remote workload 354 to the target workload 352.

Additionally, in order to prevent workloads 138 connected to other ports 330 of the network midpoint device 140 from reaching the target workload 352, the enforcement module 145 may also generate 508 ingress deny rules to deny ingress communications destined for the target workload 352 on the other ports 330 unless specifically permitted by another rule.

The enforcement module 145 configures 510 the firewall 315 of the network midpoint device 140 to enforce the midpoint device ingress rules for the downstream port 332 and the upstream port 334 and the ingress deny rules for the other ports 330, thus enabling the permitted communications to the target workload 352 from the remote workload 354.

Particularly, the enforcement module 145 configures the firewall 315 to enable the communications permitted by the midpoint device ingress rules while blocking other ingress communications between the target workload 352 and the remote workload 354 received by the downstream port 332 or the upstream port 334 that are not specifically permitted by another rule associated with the segmentation policy. For example, the enforcement module 145 may update ingress ACLs associated with the downstream port 332 and the upstream port 334 to include the midpoint device ingress rules. In operation, the firewall 315 of the network midpoint device 140 allows only ingress communications to the downstream port 332 and the upstream port 334 permitted by the respective ingress ACLs while blocking other communications. Additionally, the enforcement module 145 may update ingress ACLs associated with the other ports 330 to cause the other ports 330 to deny ingress communications sourced from the remote workload 354 and destined to the target workload 352 on these ports 330 absent another rule permitting such communications. The process of FIG. 5 thus beneficially enables bidirectional enforcement of a a management instruction on a network midpoint device 140 that does not support egress filtering by generating a firewall configuration that uses only midpoint device ingress rules.

The processes of FIGS. 4-5 beneficially enable enforcement of stateful policies using stateless firewall rules. Thus, the network midpoint device 140 does not necessarily need to be capable of enforcing stateful policies. In an embodiment, the enforcement module 145 may optionally configure network midpoint devices 140 capable of enforcing stateful policies by instead directly configuring the firewall based on the management instructions. For example, using stateful firewall rules, the enforcement module 140 may configure the firewall 315 to permit inbound or outbound connections between the target workload 352 and the remote workload 354 in accordance with the management instruction. The firewall 315 then uses a connection tracking mechanism to permit only communications consistent with the tracked connection. For network midpoint devices 140 that do not support stateful policy (or if stateful policy enforcement is optionally disabled), the enforcement module 145 may apply the above-described processes to effectively convert the stateful policy into bidirectional stateless rules that can be enforced by a stateless firewall 315 of the network midpoint device 140. In an embodiment, the enforcement module 145 may intelligently determine whether to apply the policy as a stateful firewall configuration or as stateless firewall configuration depending on the capabilities of the network midpoint device 140.

In an embodiment, the segmentation server 120 may determine if a host 130 of the target workload 352 has an internal firewall that may interfere with proper enforcement of the segmentation policy enforced by the network midpoint device 140. Here, when the host 130 has a firewall, the segmentation server 120 may control the host 130 of the target workload 352 to configure the firewall to whitelist the connections that are permitted by the policy and enforced on the network midpoint device 140. For example, the segmentation server 120 may cause the host 130 to disable a connection tracking of its firewall if present (to reduce tracking overhead and improve performance of the host 130) and to allow all relevant communications to and from the target workload 352 that conform to the specified constraints (e.g., port and protocol). In this manner, the policy may be enforced on the network midpoint device 140 without interference from a host firewall on the host 130.

The foregoing description of the embodiments of the invention has been presented for the purpose of illustration; it is not intended to be exhaustive or to limit the invention to the precise forms disclosed. Persons skilled in the relevant art can appreciate that many modifications and variations are possible in light of the above disclosure.

Some portions of this description describe the embodiments of the invention in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments of the invention may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a tangible computer readable storage medium or any type of media suitable for storing electronic instructions, and coupled to a computer system bus. Furthermore, any computing systems referred to in the specification may include a single processor or may be architectures employing multiple processor designs for increased computing capability.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

The invention claimed is:

1. A method for enforcing an instruction of a segmentation policy on a network midpoint device, the method comprising:

obtaining a network topology specifying a connectivity of a downstream port of a network midpoint device to a target workload and a connectivity of an upstream port of the network midpoint device to a remote workload;

receiving, by an enforcement module, an inbound management instruction that permits the target workload to receive an inbound connection request from the remote workload;

generating, by a processor device based on the inbound management instruction, a midpoint device ingress rule permitting the downstream port of the network midpoint device to receive ingress communications to the downstream port of network midpoint device that are sourced from the target workload and destined for the remote workload and are associated with a connection between the target workload and the remote workload established via the inbound connection request from the remote workload; and configuring the network midpoint device to enforce the midpoint device ingress rule for the downstream port by updating an ingress access control list associated with the downstream port to include the midpoint device ingress rule, wherein the ingress access control list causes the network midpoint device to block ingress communications to the downstream port not specifically permitted by a rule of the ingress access control list.

2. The method of claim 1, further comprising:
generating, based on the management instruction, a midpoint device egress rule permitting the downstream port of the network midpoint device to transmit egress communications to the target workload that are sourced from the remote workload and destined to the target workload and either represent the inbound connection request to the target workload or are associated with the connection between the target workload and the remote workload established via the inbound connection; and
configuring the network midpoint device to enforce the midpoint device egress rule for the downstream port.

3. The method of claim 2, wherein configuring the network midpoint device comprises:
updating an egress access control list associated with the downstream port to include the midpoint device egress rule, wherein the egress access control list causes the network midpoint device to block egress communications from the downstream port not specifically permitted by a rule of the egress access control list.

4. The method of claim 1, further comprising:
generating, based on the inbound management instruction, a midpoint device ingress rule permitting the upstream port of the network midpoint device to receive ingress communications that are sourced from the remote workload and destined to the target workload;
generating, based on the management instruction, midpoint device ingress deny rules denying other ports of the network midpoint device from receiving ingress communications that are destined to the target workload by default unless expressly permitted by a different midpoint device ingress rule; and
configuring the network midpoint device to enforce the midpoint device ingress rule for the upstream port and the midpoint device ingress deny rules for the other ports.

5. The method of claim 4, wherein configuring the network midpoint device comprises:
updating an ingress access control list associated with the upstream port to include the midpoint device ingress rule, wherein the ingress access control list causes the network midpoint device to block ingress communications to the upstream port not specifically permitted by a rule of the ingress access control list associated with the upstream port; and
configuring respective ingress access control lists associated with the other ports of the network midpoint device, wherein the respective ingress access control lists associated with the other ports cause the network midpoint device to block ingress communications to the other ports not specifically permitted by a rule of the ingress access control lists associated with the other ports.

6. A non-transitory computer-readable storage medium storing instructions for enforcing an instruction of a segmentation policy on a network midpoint device, the instructions when executed by a processor device cause the processor device to perform steps including:
obtaining a network topology specifying a connectivity of a downstream port of a network midpoint device to a target workload and a connectivity of an upstream port of the network midpoint device to a remote workload;
receiving, by an enforcement module, an inbound management instruction that permits the target workload to receive an inbound connection request from the remote workload;
generating, based on the inbound management instruction, a midpoint device ingress rule permitting the downstream port of the network midpoint device to receive ingress communications to the downstream port of network midpoint device that are sourced from the target workload and destined for the remote workload and are associated with a connection between the target workload and the remote workload established via the inbound connection request from the remote workload; and
configuring the network midpoint device to enforce the midpoint device ingress rule for the downstream port by updating an ingress access control list associated with the downstream port to include the midpoint device ingress rule, wherein the ingress access control list causes the network midpoint device to block ingress communications to the downstream port not specifically permitted by a rule of the ingress access control list.

7. The non-transitory computer-readable storage medium of claim 6, the instructions when executed further causing the processor device to perform steps including:
generating, based on the inbound management instruction, a midpoint device egress rule permitting the downstream port of the network midpoint device to transmit egress communications to the target workload that are sourced from the remote workload and destined to the target workload and either represent the inbound connection request to the target workload or are associated with the connection between the target workload and the remote workload established via the inbound connection; and
configuring the network midpoint device to enforce the midpoint device egress rule for the downstream port.

8. The non-transitory computer-readable storage medium of claim 7, wherein configuring the network midpoint device comprises:
updating an egress access control list associated with the downstream port to include the midpoint device egress rule, wherein the egress access control list causes the network midpoint device to block egress communications from the downstream port not specifically permitted by a rule of the egress access control list.

9. The non-transitory computer-readable storage medium of claim 6, the instructions when executed further causing the processor device to perform steps including:
generating, based on the inbound management instruction, a midpoint device ingress rule permitting the upstream port of the network midpoint device to receive ingress communications that are sourced from the remote workload and destined to the target workload;

generating, based on the inbound management instruction, midpoint device ingress deny rules denying other ports of the network midpoint device from receiving ingress communications that are destined to the target workload by default unless expressly permitted by a different midpoint device ingress rule; and configuring the network midpoint device to enforce the midpoint device ingress rule for the upstream port and the midpoint device ingress deny rules for the other ports.

10. The non-transitory computer-readable storage medium of claim 9, wherein configuring the network midpoint device comprises:

updating an ingress access control list associated with the upstream port to include the midpoint device ingress rule, wherein the ingress access control list causes the network midpoint device to block ingress communications to the upstream port not specifically permitted by a rule of the ingress access control list associated with the upstream port; and configuring respective ingress access control lists associated with the other ports of the network midpoint device, wherein the respective ingress access control lists associated with the other ports cause the network midpoint device to block ingress communications to the other ports not specifically permitted by a rule of the ingress access control lists associated with the other ports.

11. A method for enforcing an instruction of a segmentation policy on a network midpoint device, the method comprising:

obtaining a network topology specifying a connectivity of a downstream port of a network midpoint device to a target workload and a connectivity of an upstream port of the network midpoint device to a remote workload;

receiving, by an enforcement module, an outbound management instruction that permits the target workload to send an outbound connection request to the remote workload;

generating by a processor device based on the outbound management instruction, a midpoint device ingress rule permitting the downstream port of the network midpoint device to receive ingress communications to the downstream port of network midpoint device that are sourced from the target workload and destined for the remote workload and either represent the outbound connection request to the remote workload or are associated with a connection between the target workload and the remote workload established via the outbound connection request from the target workload to the remote workload; and configuring the network midpoint device to enforce the midpoint device ingress rule for the downstream port by updating an ingress access control list associated with the downstream port to include the midpoint device ingress rule, wherein the ingress access control list causes the network midpoint device to block ingress communications to the downstream port not specifically permitted by a rule of the ingress access control list.

12. The method of claim 11, further comprising:

generating, based on the outbound management instruction, a midpoint device egress rule permitting the downstream port of the network midpoint device to transmit egress communications to the target workload that are sourced from the remote workload and destined to the target workload and are associated with the connection between the target workload and the remote workload established via the outbound connection request; and configuring the network midpoint device to enforce the midpoint device egress rule for the downstream port.

13. The method of claim 12, wherein configuring the network midpoint device comprises:

updating an egress access control list associated with the downstream port to include the midpoint device egress rule, wherein the egress access control list causes the network midpoint device to block egress communications from the downstream port not specifically permitted by a rule of the egress access control list.

14. The method of claim 11, further comprising:

generating, based on the outbound management instruction, a midpoint device ingress rule permitting the upstream port of the network midpoint device to receive ingress communications that are sourced from the remote workload and destined to the target workload and are associated with the connection between the target workload and the remote workload established via the outbound connection request;

generating, based on the management instruction, midpoint device ingress deny rules denying other ports of the network midpoint device from receiving ingress communications that are destined to the target workload by default unless expressly permitted by a different midpoint device ingress rule; and configuring the network midpoint device to enforce the midpoint device ingress rule for the upstream port and the midpoint device ingress deny rules for the other ports.

15. The method of claim 14, wherein configuring the network midpoint device comprises:

updating an ingress access control list associated with the upstream port to include the midpoint device ingress rule, wherein the ingress access control list causes the network midpoint device to block ingress communications to the upstream port not specifically permitted by a rule of the ingress access control list associated with the upstream port; and configuring respective ingress access control lists associated with the other ports of the network midpoint device, wherein the respective ingress access control lists associated with the other ports cause the network midpoint device to block ingress communications to the other ports not specifically permitted by a rule of the ingress access control lists associated with the other ports.

16. A non-transitory computer-readable storage medium storing instructions for enforcing an instruction of a segmentation policy on a network midpoint device, the instructions when executed by a processor device cause the processor device to perform steps including:

obtaining a network topology specifying a connectivity of a downstream port of a network midpoint device to a target workload and a connectivity of an upstream port of the network midpoint device to a remote workload;

receiving, by an enforcement module, an outbound management instruction that permits the target workload to send an outbound connection request to the remote workload;

generating, based on the outbound management instruction, a midpoint device ingress rule permitting the downstream port of the network midpoint device to receive ingress communications to the downstream port of network midpoint device that are sourced from the target workload and destined for the remote workload and either represent the outbound connection request to the remote workload or are associated with a connection between the target workload and the remote workload established via the outbound connection request from the target workload to the remote workload; and configuring the network midpoint device to enforce the midpoint device ingress rule for the downstream port by updating an ingress access control list associated with the downstream port to include the midpoint device ingress rule, wherein the ingress access control list causes the network midpoint device to block ingress communications to the downstream port not specifically permitted by a rule of the ingress access control list.

17. The non-transitory computer-readable storage medium of claim 16, the instructions when executed further causing the processor device to perform steps comprising:

generating, based on the outbound management instruction, a midpoint device egress rule permitting the downstream port of the network midpoint device to transmit egress communications to the target workload that are sourced from the remote workload and destined to the target workload and are associated with the connection between the target workload and the remote workload established via the outbound connection request; and configuring the network midpoint device to enforce the midpoint device egress rule for the downstream port.

18. The non-transitory computer-readable storage medium of claim 17, wherein configuring the network midpoint device comprises:

updating an egress access control list associated with the downstream port to include the midpoint device egress rule, wherein the egress access control list causes the network midpoint device to block egress communications from the downstream port not specifically permitted by a rule of the egress access control list.

19. The non-transitory computer-readable storage medium of claim 16, the instructions when executed further causing the processor device to perform steps comprising:

generating, based on the outbound management instruction, a midpoint device ingress rule permitting the upstream port of the network midpoint device to receive ingress communications that are sourced from the remote workload and destined to the target workload and are associated with the connection between the target workload and the remote workload established via the outbound connection request;

generating, based on the management instruction, midpoint device ingress deny rules denying other ports of the network midpoint device from receiving ingress communications that are destined to the target workload by default unless expressly permitted by a different midpoint device ingress rule; and configuring the network midpoint device to enforce the midpoint device ingress rule for the upstream port and the midpoint device ingress deny rules for the other ports.

20. The non-transitory computer-readable storage medium of claim 19, wherein configuring the network midpoint device comprises:

updating an ingress access control list associated with the upstream port to include the midpoint device ingress rule, wherein the ingress access control list causes the network midpoint device to block ingress communications to the upstream port not specifically permitted by a rule of the ingress access control list associated with the upstream port; and configuring respective ingress access control lists associated with the other ports of the network midpoint device, wherein the respective ingress access control lists associated with the other ports cause the network midpoint device to block ingress communications to the other ports not specifically permitted by a rule of the ingress access control lists associated with the other ports.

* * * * *